No. 652,027. Patented June 19, 1900.
S. E. JOHANNESEN.
TRANSFORMER.
(Application filed Feb. 14, 1900.)

(No Model.) 6 Sheets—Sheet 1.

Witnesses
W. A. Alexander
Jessie R. Watkins

Inventor
S. E. Johannesen
By Attorneys

THE NORRIS PETERS CO., PHOTO-LITHO., WASHINGTON, D. C.

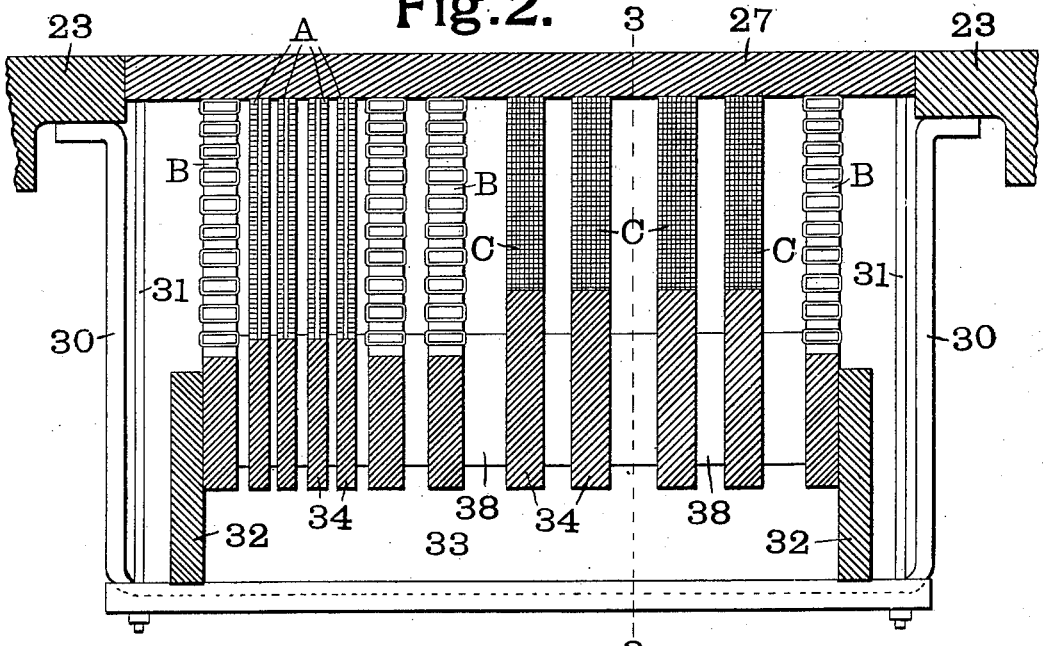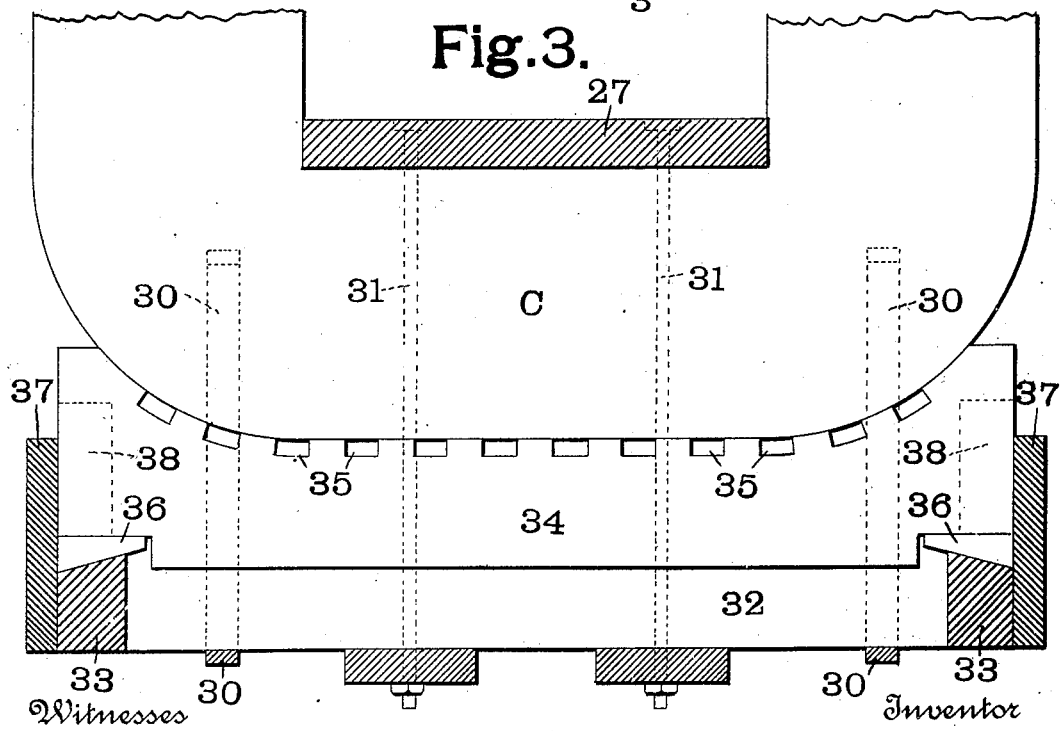

No. 652,027. Patented June 19, 1900.
S. E. JOHANNESEN.
TRANSFORMER.
(Application filed Feb. 14, 1900.)
(No Model.) 6 Sheets—Sheet 3.

Witnesses
W. H. Alexander
Jessie R. Watkins

Inventor
S. E. Johannesen
By Attorneys

No. 652,027. Patented June 19, 1900.
S. E. JOHANNESEN.
TRANSFORMER.
(Application filed Feb. 14, 1900.)
(No Model.) 6 Sheets—Sheet 4.

Witnesses
W. A. Alexander
Jessie R. Watkins

Inventor
S. E. JOHANNESEN
By Attorneys
Fowler & Fowler

THE NORRIS PETERS CO., PHOTO-LITHO., WASHINGTON, D. C.

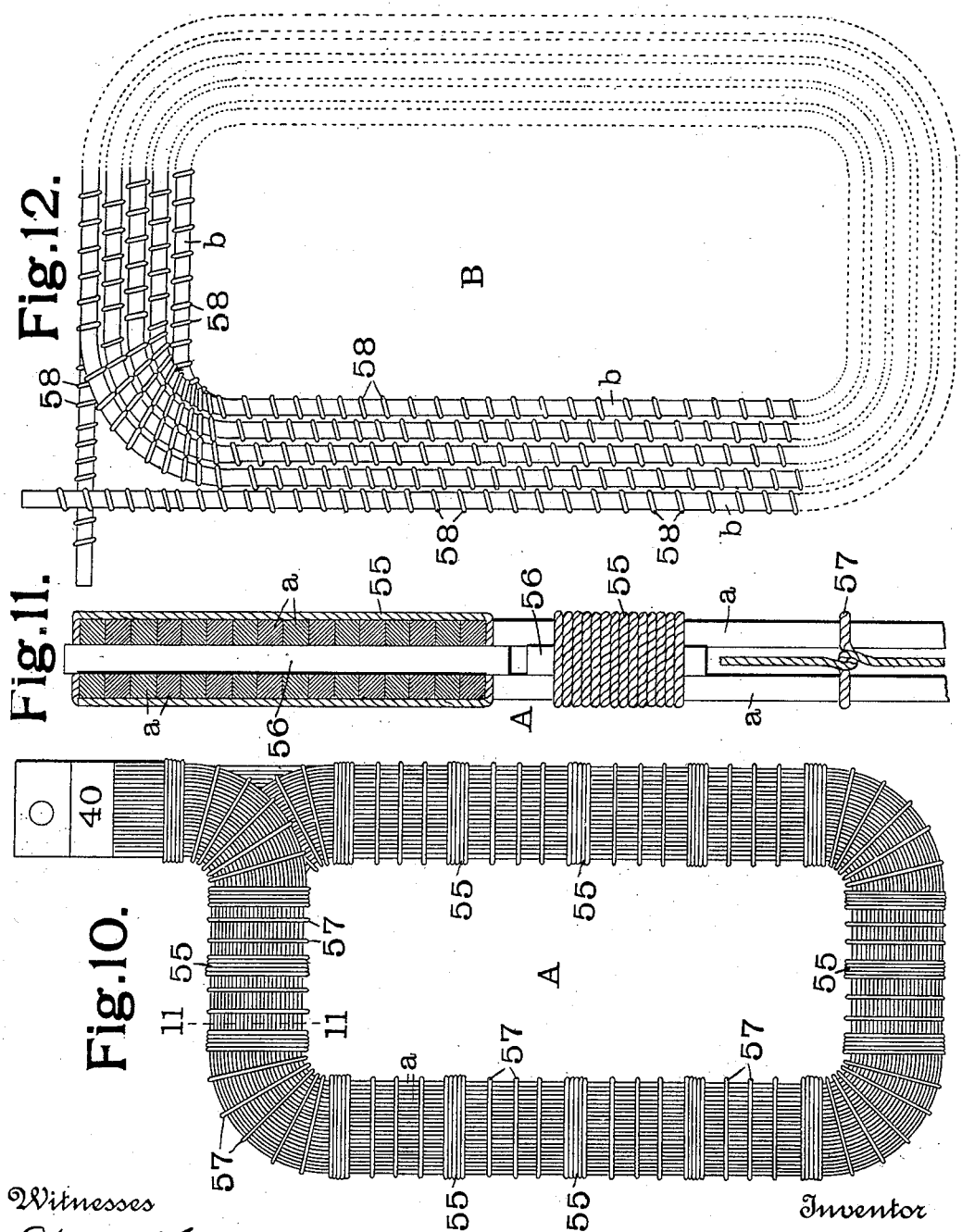

No. 652,027. Patented June 19, 1900.
S. E. JOHANNESEN.
TRANSFORMER.
(Application filed Feb. 14, 1900.)

(No Model.) 6 Sheets—Sheet 6.

Witnesses
W. A. Alexander
Jessie R. Watkins

Inventor
S. E. Johannesen
By Attorneys
Foster & Fowler

UNITED STATES PATENT OFFICE.

SVEND E. JOHANNESEN, OF ST. LOUIS, MISSOURI.

TRANSFORMER.

SPECIFICATION forming part of Letters Patent No. 652,027, dated June 19, 1900.

Application filed February 14, 1900. Serial No. 5,150. (No model.)

*To all whom it may concern:*

Be it known that I, SVEND E. JOHANNESEN, a citizen of the United States, residing at the city of St. Louis, in the State of Missouri, have invented a certain new and useful Transformer, of which the following is such a full, clear, and exact description as will enable any one skilled in the art to which it appertains to make and use the same, reference being had to the accompanying drawings, forming part of this specification.

My invention relates more particularly to large-sized transformers, which are used for very heavy currents.

One object of my invention is to provide improved means for supporting the coils of such a transformer whereby damage or injury to the insulation of the coils and the consequent short-circuiting is prevented.

Another object of my invention is to provide improved connections for the high-tension coils of a transformer.

Still another object of my invention is to improve the construction of the coils, whereby good insulation is provided and at the same time the coils are left free to the circulation of oil or other insulating liquid.

My invention consists in various novel features and details of construction, described in the following specification and pointed out in the claims affixed hereto.

Figure 1:
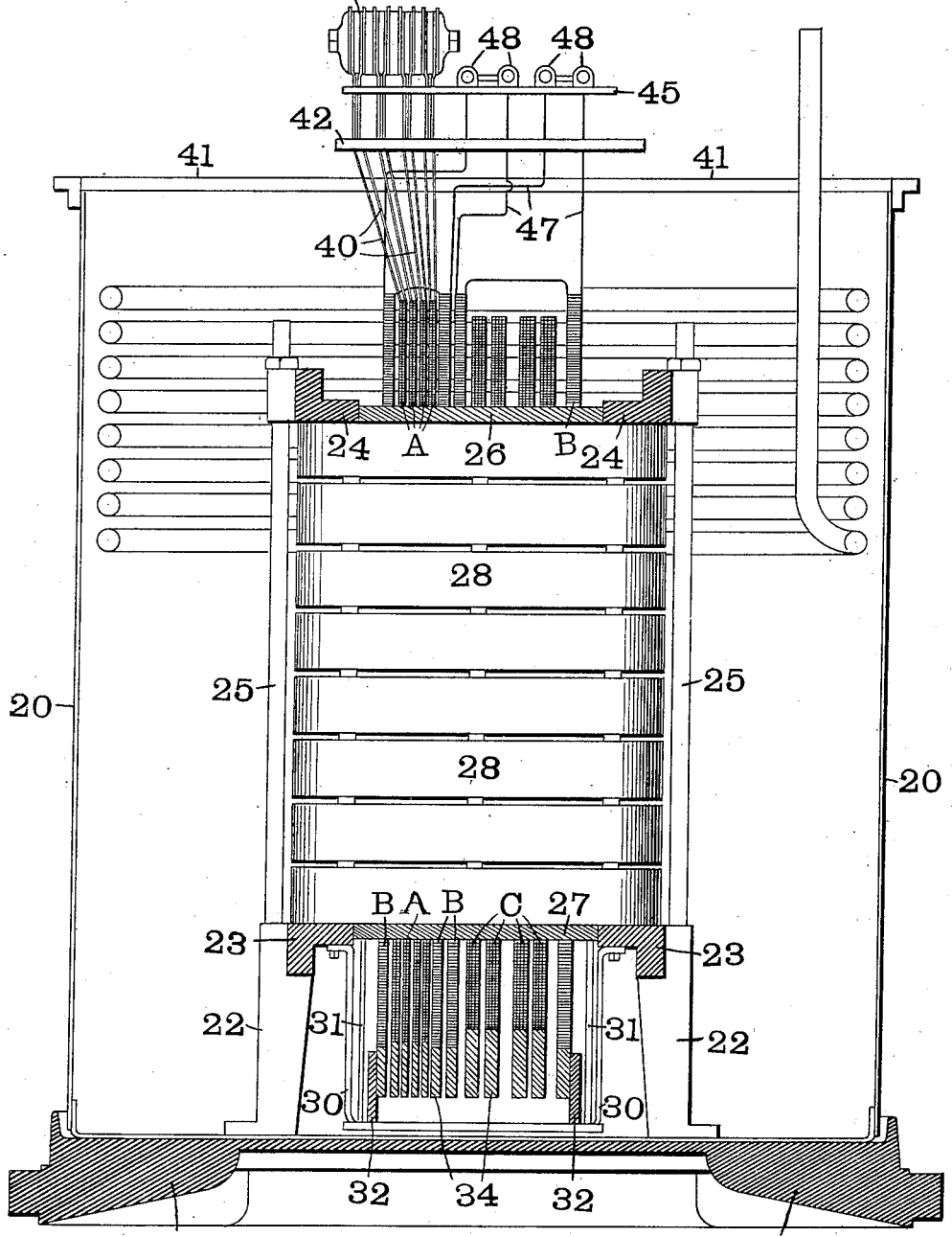
Figure 4:
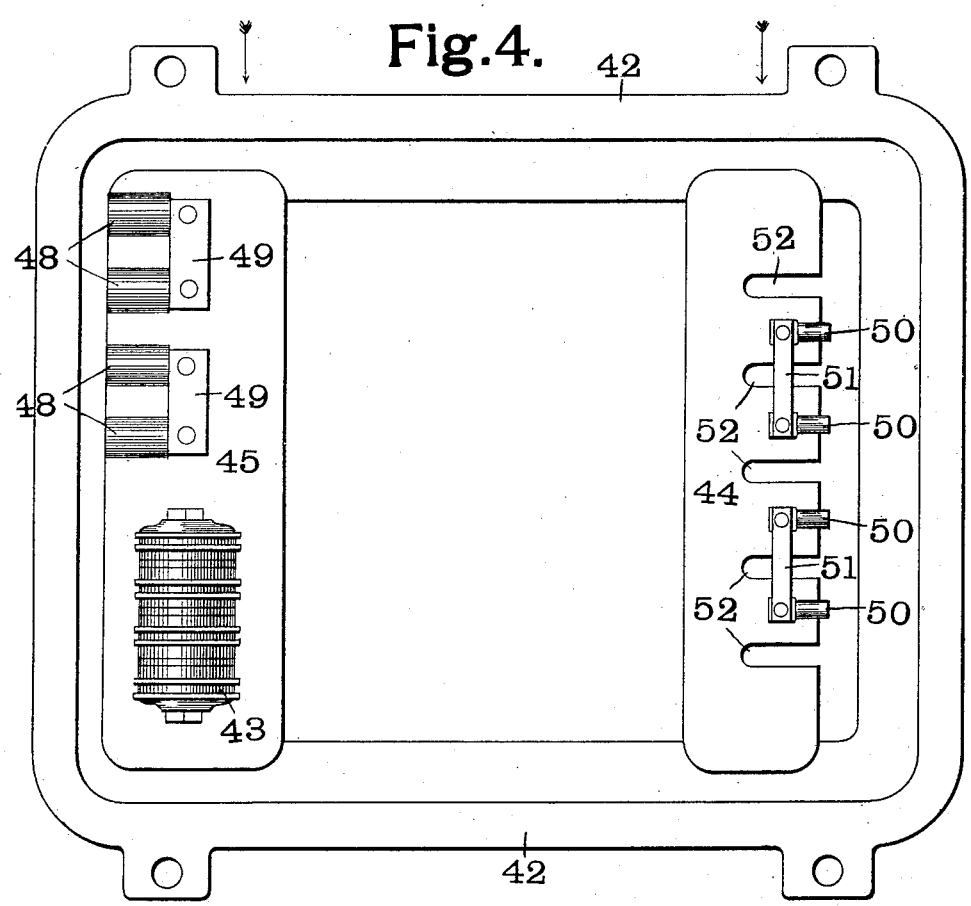
Figure 5:
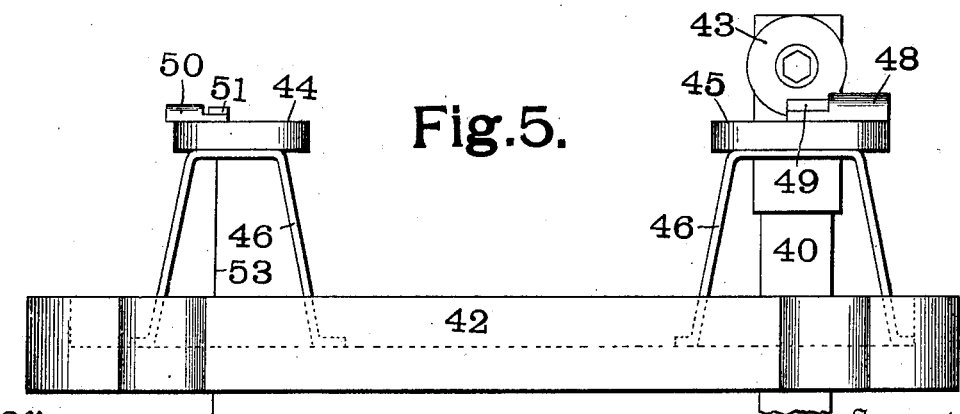
Figure 6:
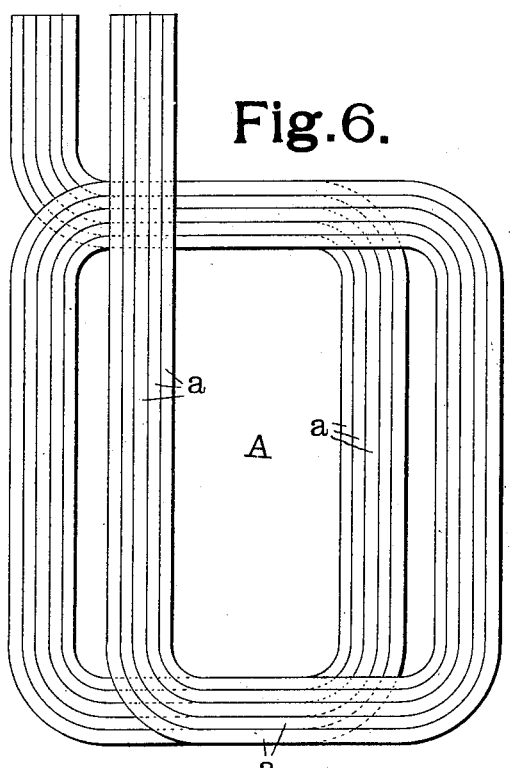
Figure 7:
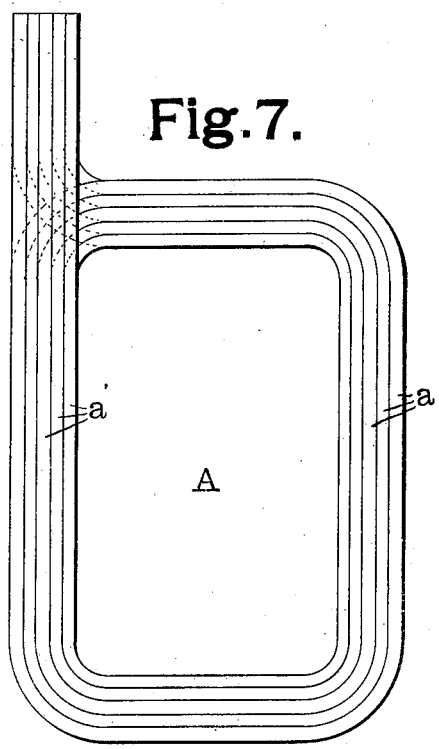
Figure 8:
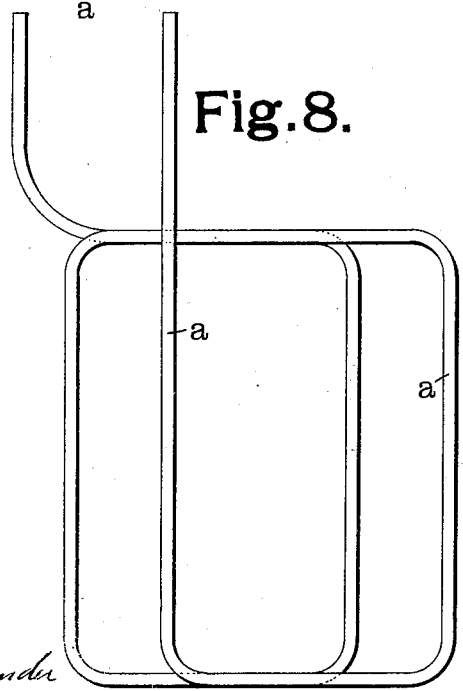
Figure 9:
Figure 13:
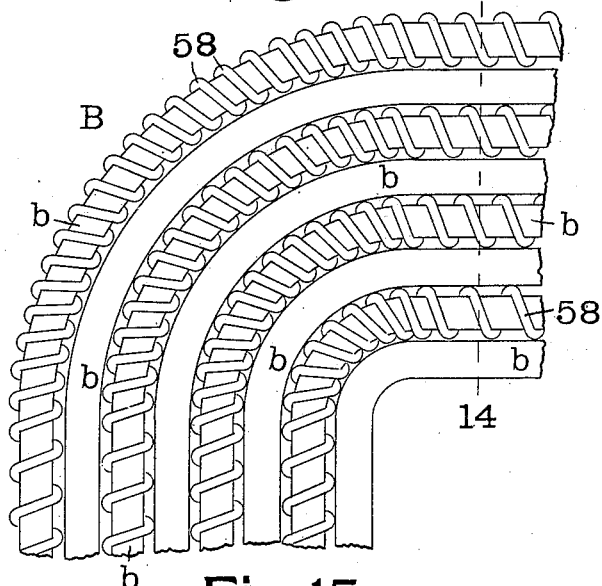
Figure 14:
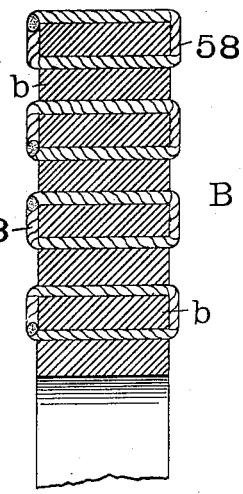
Figure 15:
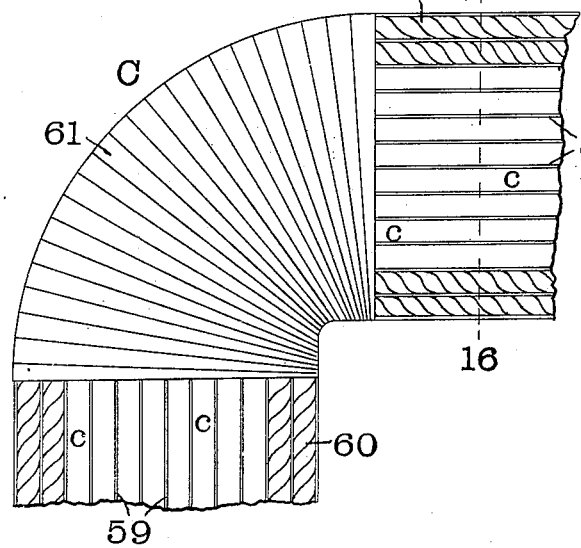
Figure 16:
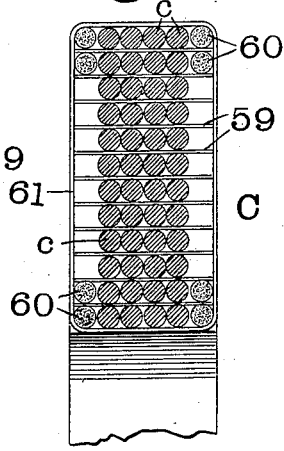

In the accompanying drawings, which illustrate a transformer made in accordance with my invention, Figure 1 is a vertical central section of the transformer and casing. Fig. 2 is an enlarged view similar to Fig. 1, but showing only the lower part of the transformer. Fig. 3 is a section on the line 3 3 of Fig. 2. Fig. 4 is a top plan view showing the connections. Fig. 5 is a side view of the parts shown in Fig. 4, taken in the direction of the arrows in Fig. 4. Figs. 6 and 7 are diagrammatical views showing the manner of constructing the low-tension coils. Figs. 8 and 9 are diagrammatical views of one of the strips from which the low-tension coils are built up. Fig. 10 is a side view of one of the low-tension coils. Fig. 11 is an enlarged section on the line 11 11 of Fig. 10. Fig. 12 is a side view of one of the medium-tension coils, partly in full lines and partly in dotted lines. Fig. 13 is an enlarged view of one of the medium-tension coils, showing a slight modification of construction. Fig. 14 is a section on the line 14 14 of Fig. 13. Fig. 15 is an enlarged view of a portion of one of the high-tension coils, and Fig. 16 is a section on the line 16 16 of Fig. 15.

Like marks of reference refer to similar parts in the several views of the drawings.

20 is the casing, which may be of any of the usual forms. The casing 20 is preferably supported by a base 21. Supported within the casing 20 by legs 22 is a lower frame 23. An upper frame 24 is supported from the lower frame 23 by means of rods or bolts 25. Carried by the upper frame 24 is a cross-piece 26 and by the lower frame 23 a similar cross-piece 27.

The coils of the transformer consist of low-tension coils A, medium-tension coils B, and high-tension coils C. The coils are provided with cores 28, preferably of the shell type. In large-sized transformers as heretofore constructed it has been usual to support the coils of the transformer from an upper cross-piece similar to the cross-piece 26, hereinbefore described. The weight of the coils is so great, however, that when thus supported the insulation of the upper part of the coils is likely to be injured, thus short-circuiting the coils. In order to prevent this, I provide a separate support for the bottom of each coil independent of the upper support. The construction by which I accomplish this is as follows:

From the lower frame 23 I support, by means of hangers 30 and 31, cross-bars 32, which are connected by end pieces 33. 34 indicates coil-supports, one of which is provided for each of the coils A, B, and C. The coil-supports 34 are constructed to fit the lower ends of the coils and preferably are provided with openings 35 to allow free circulation of the insulating liquids contained in the casing 20. The coil-supports 34 are adjusted by means of wedges 36, Fig. 3, which are interposed between the end pieces 33 and the said coil-supports. The wedges 36 are held in position after the adjustment of the supports 34 by means of strips 37. The supports 34 are held apart by means of spacing-strips 38 or in any other suitable way.

The conductors 40, leading from the low-tension coils A, pass up through an opening in the cover 41 and a frame 42, carried by said cover. The conductors are clamped together at 43, Figs. 1, 4, and 5, with insulating-washers between them. In my preferred form of connections strips 44 and 45, of wood or other insulating material, are supported from the frame 42 by means of U-shaped parts 46. The conductors 40 from the low-tension coils A pass up through the strip 45 and are bolted together at 43, as above described. The conductors 47 from the medium-tension coils B are brought to terminals 48, which are provided with removable connections 49, whereby the coils B can be thrown either into series or multiple connection. The conductors 53 from the high-tension coils C are brought to terminals 50, carried on the insulating-strip 44 and provided with removable connections 51. Between the terminals 50 the strip 44 has formed in it slots 52 to prevent leakage of the current from one terminal to another, which might otherwise take place owing to the high tension of the current.

The conductors of the low-tension coils A are built up with a plurality of strips $a$, of copper. The strips $a$ are rectangular in cross-section and preferably square. They are placed together edgewise, as diagrammatically illustrated in Figs. 6 and 7, so as to form a flat rectangular conductor, as best shown in Fig. 11. Each of the coils A is preferably formed of but two turns of the compound conductor. Passing around the conductors of the coils A at intervals are windings 55, formed of cord or rope. Between the turns of the conductors, at the points where they are provided with the windings 55, are insulated strips 56, of wood or other insulating material, which separate the said turns of the conductor. Between the windings 55 are placed one or more windings 57, preferably each composed of but a single strand of cord or rope. The windings 57 hold the turns of the coil firmly in place and also serve as insulation to prevent the conductors coming in contact with each other or the conductors of other coils and at the same time leaving the conductors of the coils free to the circulation of the oil or other insulating liquid in the converter.

The medium-tension coils B are formed of rectangular conductors $b$, which are preferably considerably wider than their thickness, as shown in Fig. 14. The conductors $b$ are insulated by means of windings 58, of cord or rope, the turns of said windings being some distance apart, so as to allow the free circulation of the oil or other insulating liquid. Instead of placing the windings 58 around each turn of the conductors $b$, as shown in Fig. 12, the said windings may be applied to each second turn of the conductors, as shown in Figs. 13 and 14.

The high-tension coils C are formed of ordinary insulated wires $c$. The layers of wires $c$ are separated by means of sheets 59 of insulating material and preferably fuller-board. The edges of the sheets 59 project beyond the layers of wire $c$, as best shown in Fig. 16. The space between the fuller-board sheets 59 at the edges of the coils C are filled with rope 60 or other fibrous material. The coils are held in place by means of wrappings 61 of suitable insulating material, such as fuller-board tape. The rope 60 prevents the wrappings 61 from crushing in the ends of the sheets 59, and hence leaves space for the circulation of the oil around the coils and also provides means for preventing the arcing of the current from one layer of wire to another in case of injury to the insulation of the conductors.

In securing the coils in place the supports 34 are first placed beneath the coils. The retaining-strips 37 being removed, the wedges 36 are then driven in position to force the supports 34 up against the coils and support a portion of the weight of said coils. After the wedges 36 have been properly adjusted their ends are cut off even with the ends of the supports 34 and the retaining-strips 37 secured in position. This prevents the wedges 36 from slipping out and retains the supports in the desired position.

Having fully described my invention, what I claim as new, and desire to secure by Letters Patent of the United States, is—

1. In a transformer, the combination with a plurality of coils arranged vertically and side by side, of means for supporting said coils from the top, and means for separately supporting said coils from the bottom.

2. In a transformer, the combination with a plurality of coils, of means for supporting said coils at the top, a separate support for the bottom of each of said coils, and means for independently adjusting said bottom supports.

3. In a transformer, the combination with a plurality of coils, of means for supporting said coils from the top, a support for the bottom of each of said coils, and wedges for independently adjusting said bottom supports.

4. In a transformer, the combination with a plurality of coils, of a plate of insulating material, terminals carried by said plate, conductors leading from said coils to said terminals, and slots formed in said plate between said terminals.

5. A coil for transformers consisting of a compound conductor formed of a plurality of rectangular metallic strips placed edge to edge, and means for holding said strips in position.

6. A coil for transformers consisting of a compound conductor formed of a plurality of rectangular metallic strips placed edge to edge, and windings surrounding said coil at intervals, and leaving exposed spaces between said windings.

7. A coil for transformers consisting of an uncovered conductor the individual turns of which are provided with windings of cord or rope arranged to leave exposed spaces between said windings for the passage of a cooling medium.

8. A coil for transformers consisting of layers of conductors wound one upon another and separated by sheets of insulating material, said sheets of insulating material projecting laterally beyond said layers of conductors.

9. A coil for transformers consisting of layers of conductors separated by sheets of insulating material, said sheets of insulating material projecting beyond said layers of conductors, and a filling of fibrous material placed between said sheets of insulating material at the edges of said coil.

In testimony whereof I have hereunto set my hand and affixed my seal in the presence of the two subscribing witnesses.

SVEND E. JOHANNESEN. [L. S.]

Witnesses:
W. A. ALEXANDER,
JESSIE R. WATKINS.